Figure 8:
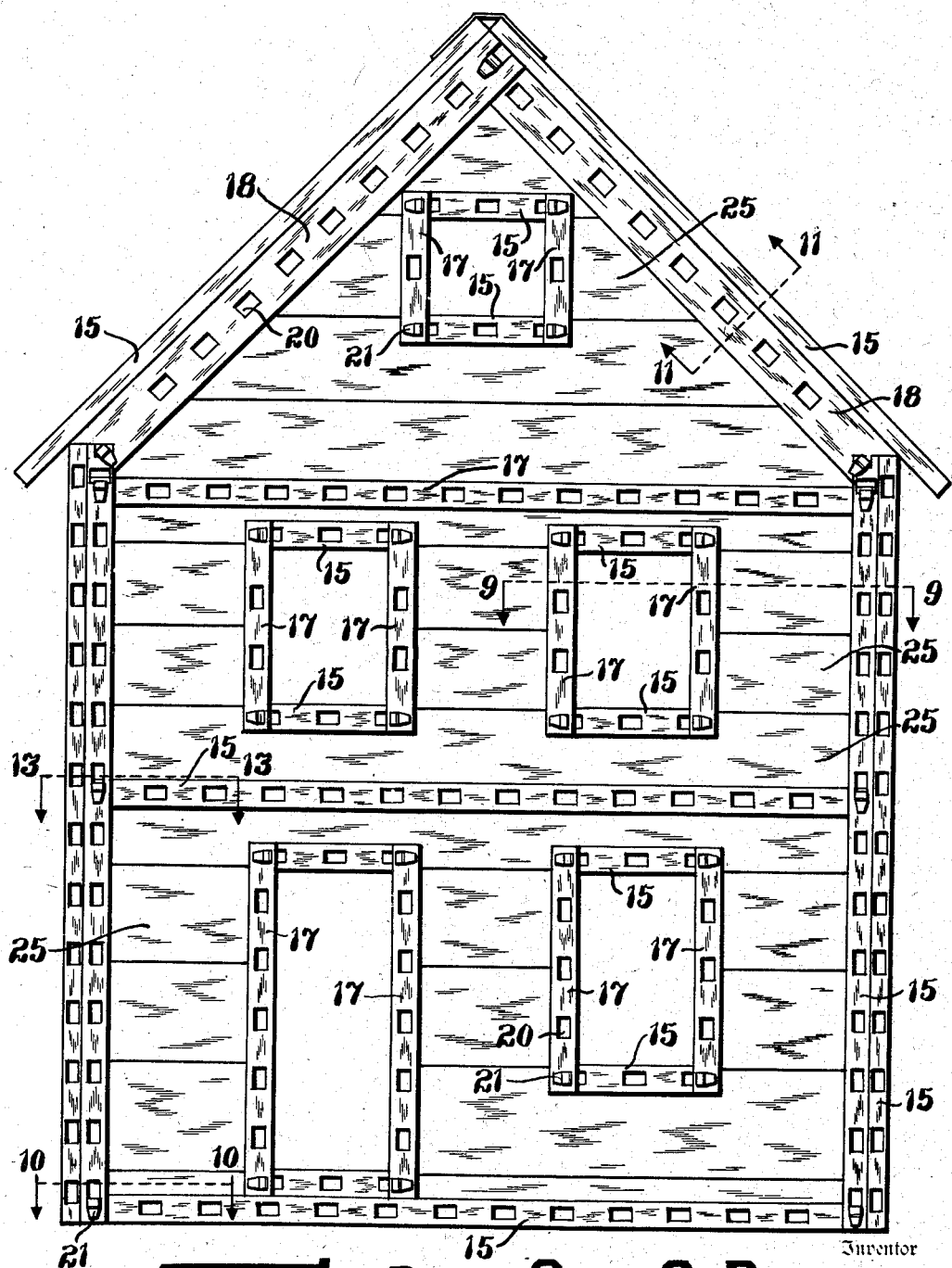

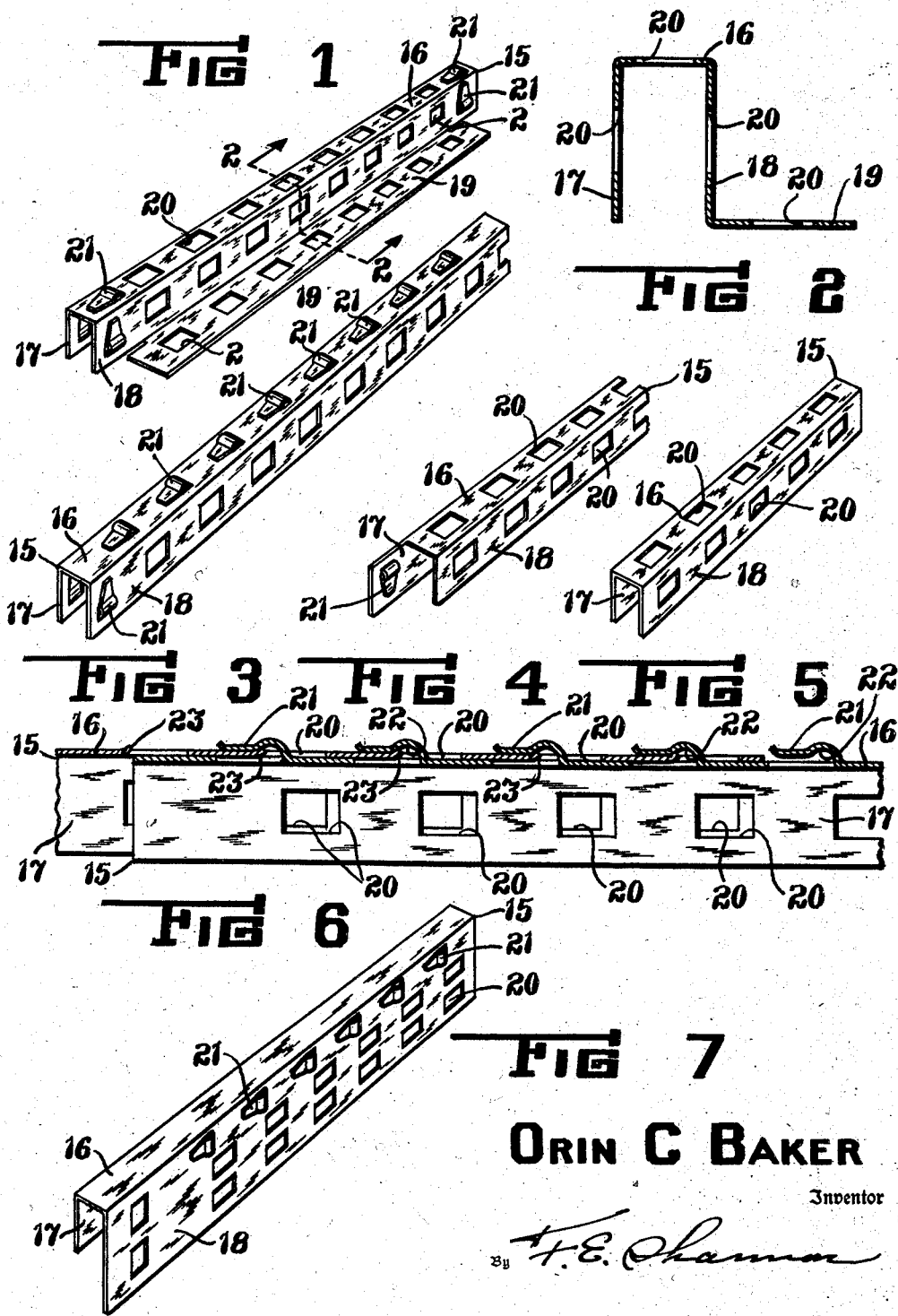

Inventor
ORIN C BAKER

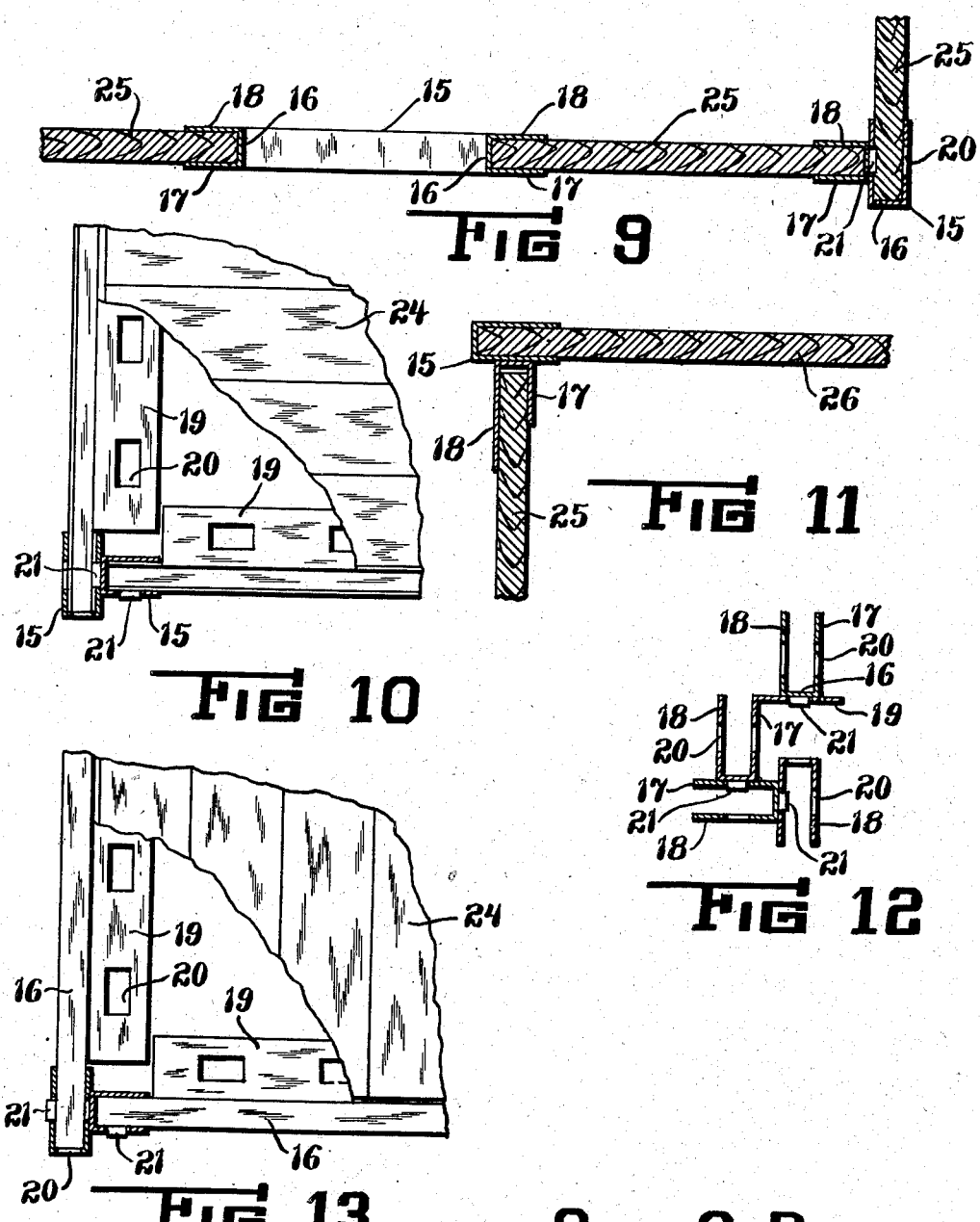

Patented Feb. 13, 1940

2,190,004

UNITED STATES PATENT OFFICE 2,190,004

STRUCTURAL ELEMENT

Orin C. Baker, Cleveland, Ohio

Application August 26, 1938, Serial No. 226,927

1 Claims. (Cl. 189—1)

This invention relates to improvements in structural elements which may be used in toy building sets or employed in fabricating buildings or other structures.

Objects of the invention are to provide a strong, durable structural element having means formed integrally therewith for detachably securing it to a similar element or elements in a number of different relative positions; to provide a structural element having tongues and apertures with the tongues enterable in the apertures of a similar element or elements to detachably secure the same in assembled relation; to provide a structural element having improved tongues provided with indentations and with ridges at the edges of the apertures arranged to snap into said indentations to yieldably restrain unintentional separation of the assembled parts; to provide a structural element in the form of a channel with integrally formed interlocking means for detachably securing its sides and flanges longitudinally against the sides and flanges of a similar element and which may be securely connected in overlapping relation to form elements of any desired length or secured in substantially any transverse position to a similar element and to thereby provide a structural element which can be securely connected to similar elements and used to a decided advantage in the construction of structures of various types and sizes.

In the accompanying drawings, I have shown an illustrative embodiment of a structural element constructed in accordance with this invention and have shown various ways in which the same can be used, it being understood that the invention is not confined to the exact form shown and that changes and modifications may be made which come within the scope of the appended claims.

In the drawings:

Figure 1 is a perspective view of a structural element constructed in accordance with this invention, Figure 2 is a cross sectional view of same taken as indicated by the lines 2—2 of Figure 1, Figure 3 is a perspective view of a similar element showing a somewhat different arrangement of tongues and apertures in the walls thereof, Figure 4 is a fragmentary, perspective view showing an end portion of an element embodying the principles of this invention, Figure 5 is a perspective view showing a similar part, Figure 6 is a longitudinal, sectional view illustrating the manner of securing two elements in overlapping relation, Figure 7 is a perspective view showing a structural element of modified form constructed in accordance with this invention, Figure 8 is a front, elevational view of a building formed of elements constructed in accordance with this invention.

Figure 9 is a horizontal, sectional view taken as indicated by the lines 9—9 of Figure 8, Figure 10 is a similar, sectional view taken as indicated by the lines 10—10 of Figure 8, Figure 11 is a fragmentary, cross sectional view taken as indicated by the lines 11—11 of Figure 8, Figure 12 is a cross sectional view somewhat diagrammatic in character illustrating an assembly of several structural elements constructed in accordance with this invention, Figure 13 is a horizontal, sectional view taken as indicated by the lines 13—13 of Figure 8.

Proceeding now to a detailed description of the invention with reference to the particular adaptation thereof shown in the drawings, the numeral 15 denotes a channel member having a web 16 and side walls 17 and 18. Each channel member 15 may be provided with additional flanges, for example, the flange 19 which projects at a right angle to the side wall 18 as shown in Figure 1. The walls 16, 17 and 18 and the flange 19 are provided with apertures 20 and with resilient tongues 21 which are arranged in rows disposed longitudinally thereof.

In Figure 1 there is shown a web 16, side walls 17 and 18 and a flange 19, each provided with a longitudinally disposed row of rectangular apertures 20. The web 16 and the side walls 17 and 18 being each provided with a tongue 21 at each end thereof. The arrangements of the tongues 21 and apertures 20 may be varied to provide longitudinally disposed rows of tongues as shown in the web 16 in Figure 3 and the side wall 18 in Figure 7 or the apertures 20 and the tongues 21 may be interspersed or arranged on the channel members 15 in any suitable position. The tongues 21 and the apertures are preferably positioned on the channel members 15 at regularly spaced intervals whereby the tongues 21 on one element 15 may be entered in the apertures 20 of a like element as shown in Figure 6. Each tongue 21 is stamped from the metal of which the channel is composed and, while it may be of any suitable shape, in the drawings there is illustrated a tongue 21 having a relatively wide base portion and side walls which taper to a narrow free end portion. The base portion is curved upwardly, then downwardly to form a laterally disposed groove 22 which extends transversely thereof on the underside thereof. One or more of the walls of each aperture 20 may be turned upwardly to form a lip 23 which is adapted to snap into the groove 22 as shown in Figure 6. The tongues 21 are formed of resilient material and the lips 23 are seated in the transverse grooves 22 when two or more elements are secured in assembled relation thereby providing efficient means for restraining the assembled elements 15 against unintentional separation. Two or more of the elements 15 can be secured in overlapping relation to form strong frame members of any suitable length. Any number of elements 15 may be quickly assembled in a variety of ways to form posts, girders or other frame members for practically any purpose.

To illustrate the possible combinations which may be obtained from a plurality of structural elements constructed in accordance with this invention, in Figure 12 there is shown one method of assembling four elements. From this illustration, it will be seen that a structural element constructed in accordance with this invention can be used in forming a frame for any building or other structure. In Figure 8 a plurality of elements 15 are shown assembled in the form of a house. In this assembly, two members 15 are connected as shown in Figure 10 to form corner posts and members 15 having flanges 19 form the sills. Each sill member is entered in a channel at the lower end of the corner post with the web 16 presented downwardly and the flange 19 presented inwardly. While other members 15 in the form of joists or girders may be supported on the flanges 19, in Figure 10 there is shown floor boards 24 supported only by said flange. The floors 24 of the second and third stories are likewise supported on horizontal channel members 15 which connect the corner posts as shown in Figure 8. On these floors the member 15 is inverted with the flange 19 projecting inwardly and the boards 24 are positioned thereon as shown in Figure 13.

In the construction illustrated in Figure 8, each corner post provides a member 15 with its channel presented toward the channel of a like member in the adjacent post and the members 15 used as sill and cross members also present a channel in which siding boards 25 are received and held. The windows and doors are formed of channel members 15 having ends shown in Figure 4 and are assembled with the channels presented outwardly to receive the siding boards 25. As the walls 17 and 18 engage the boards 25 at the top and bottom of each window or door, short boards filling the space between doors and windows will be securely supported by the flanges 17 and 18.

In Figure 11 there is shown a section of the roof in which the connected members 15 present channels for the siding 25 and the roof boards 26.

While in Figures 8, 9, 10 and 11, I have shown a simple form of wall and roof construction, it will be seen that the elements 15 may be used to provide additional rafters, girders, joist, etc., and that practically any type of construction can be carried into effect by the use of structural members constructed in accordance with this invention.

While I have shown my improved structural element formed of thin sheet metal and illustrated the same as it may be used in a toy or model building set, it will be understood that the same may be applied to general construction work and formed of any thickness which will provide the strength necessary for the purposes for which it is used.

Having thus illustrated my invention and described the same in detail, what I claim as new and desire to secure by Letters Patent is:

1. In a structural element, a channel member having tongues and apertures, the apertures positioned to receive the tongues on a similar element, a lip formed on said channel member adjacent each aperture, each tongue indented to provide a transverse groove for receiving said lip on a like member.

2. In a building set, a plurality of channel members, tongues stamped on each channel member to extend in parallel relation along the adjacent surface thereof, said tongues having an outwardly bulged base portion forming a seat on the inner side thereof and a lip on said channel member, each tongue on each member arranged to be entered in an aperture in a similar member and moved to engage the wall of said similar member with the adjacent lip on the similar member entered in the seat on the other member.

3. In a structural element, a channel member; a longitudinally directed row of tongues stamped on a wall thereof, said tongues positioned in flat, parallel relation to the surface of said wall with the base portion thereof bulged outwardly to form an indentation on the inner side thereof, said tongues being equally spaced along said wall with the free ends thereof directed toward one end of the element.

4. A sheet metal structural element having apertures, a lip at the edge of each aperture, tongues struck out of said element, said tongues positioned in flat, parallel relation to the adjacent surface of the element; each tongue provided at the base thereof on the inner side thereof with an indentation for receiving said lip when the tongue of one member is entered in an aperture in a similar member.

5. A sheet metal structural element having apertures, struck-out tongues on said member, each tongue having an upwardly bulged base portion and a flat end portion, said end portion disposed in close, parallel relation to the plane of the member whereby the tongue on one member may be entered in an aperture on a like member with the bulged base portion urging the flat end portion against the like member to connect the same in various, relative positions.

6. In a building construction, like channel members having tongues and apertures, the end of one member inserted in the channel of the other member with a tongue on the flange of one member received in an aperture in the flange of the other to connect the members without additional fastening means, said channel members arranged with certain of the members oppositely disposed in the same plane and surface panels extending between said oppositely disposed members with the end portions thereof received in said channels and a frame for an opening comprising like channel members connected by said tongues and apertures with the channels directed outwardly, said frame interposed in said surface panels with the ends of the panels received in the channels in said frame.

7. In a building construction, like channel members having tongues and apertures for receiving said tongues for connecting the same to form a frame without additional fastening means with the end of one member entered in the channel of the other and filling members extending between certain of said members with the end portions thereof received in the channels of said members and a window frame comprising four of said channel members connected by said tongues with the channels positioned outwardly, said window frame interposed in said filling members with the oppositely positioned ends thereof received in said channels.

8. In a building construction, a framework comprising a pair of channel members each having a series of apertures in a flange thereof, another pair of channel members having a series of apertures in each flange thereof and at least one tongue on a flange of said second pair of channel members, said channel members being connected to form said framework by inserting the end of one channel member in the channel of another member with a tongue on the flange of one member entered in an aperture in a flange on the other member, and a filling panel extending between certain of said members of said framework with the ends of the panel received in said channels.

9. In a building construction, a framework including vertical post members and horizontal sill members, said members being of channel formation and connected together to form said framework, the flanges of one pair of channel members having a series of apertures therein, another pair of channel members having a series of apertures in each flange thereof and at least one tongue on a flange of said second pair of channel members, the connection between the channel members being effected by inserting one end of one channel member in the channel of another member with a tongue on the flange of one channel member engaged in an aperture in the flange of the other channel member, and a filling panel extending between certain of said channel members with the ends of the panel received in said channel members.

10. In a building construction, a framework including post members and sill members, said members being of channel formation, a pair of said channel members, each having a series of apertures in a flange thereof, another pair of channel members having a series of apertures in each flange thereof and at least one tongue on a flange of said second pair of channel members, said channel members being connected together in different relative positions by inserting one end of one channel member in the channel of another member with a tongue on one member entered in an aperture in the other member, said channel members being assembled with certain of the members oppositely positioned in the same vertical plane to form said sills and wall units extending between oppositely positioned channel members with the ends thereof received in said channel members.

11. In a building construction, a framework comprising a pair of channel members, each having a series of apertures in a flange thereof, another pair of channel members having a series of apertures in each flange thereof and at least one tongue on a flange of said second pair of channel members, said channel members being connected by inserting the end of one member in the channel of the other member with a tongue on a flange of one member entered in an aperture in the flange of the other member to form vertical posts and horizontal sills, certain of said horizontal sills being oppositely positioned in the same plane and panel members extending between said sills with the ends of the panel members received in the channels of said sills.

ORIN C. BAKER.